United States Patent
Baumann et al.

(10) Patent No.: US 11,529,882 B2
(45) Date of Patent: Dec. 20, 2022

(54) CHARGE-PORT CAPTURE DETECTION MECHANISM FOR BATTERY ELECTRIC VEHICLE

(71) Applicant: Caterpillar Inc., Peoria, IL (US)

(72) Inventors: Jonathan Matthew Baumann, Hanna City, IL (US); Dustin C. Selvey, Eureka, IL (US); Alexander C. Crosman, III, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 161 days.

(21) Appl. No.: 16/947,199

(22) Filed: Jul. 22, 2020

(65) Prior Publication Data

US 2022/0024331 A1    Jan. 27, 2022

(51) Int. Cl.
| | |
|---|---|
| *H02J 7/00* | (2006.01) |
| *B60L 53/16* | (2019.01) |
| *B60L 50/60* | (2019.01) |
| *B60L 53/66* | (2019.01) |
| *B60L 53/18* | (2019.01) |
| *H01R 11/28* | (2006.01) |
| *H01R 13/627* | (2006.01) |

(52) U.S. Cl.
CPC .............. *B60L 53/16* (2019.02); *B60L 50/60* (2019.02); *B60L 53/66* (2019.02); *H02J 7/0036* (2013.01); *H02J 7/0045* (2013.01); *B60L 53/18* (2019.02); *H01R 11/285* (2013.01); *H01R 13/6278* (2013.01)

(58) Field of Classification Search
CPC .......... B60L 53/16; B60L 50/60; B60L 53/66; B60L 53/18; H02J 7/0036; H02J 7/0045; H01R 11/285; H01R 13/6278
USPC .............................................. 320/109; 701/22
See application file for complete search history.

(56) References Cited

U.S. PATENT DOCUMENTS

| | | |
|---|---|---|
| 10,046,661 B2 | 8/2018 | DeDona et al. |
| 10,286,800 B2 | 5/2019 | DeDona et al. |
| 10,358,044 B2 | 7/2019 | Veiga et al. |
| 2013/0102163 A1 | 4/2013 | Basavarajappa |
| 2013/0130525 A1* | 5/2013 | Hachadorian ...... H01R 13/5213 439/142 |
| 2018/0257497 A1* | 9/2018 | Veiga ...................... B60L 53/18 |
| 2019/0241073 A1 | 8/2019 | Homedes Pedret et al. |
| 2020/0247261 A1* | 8/2020 | Kojima ............... H02J 7/00034 |

FOREIGN PATENT DOCUMENTS

| | | |
|---|---|---|
| CN | 110061626 A | 7/2019 |
| JP | 2010161910 A | 7/2010 |
| WO | WO2018218306 A1 | 12/2018 |

* cited by examiner

*Primary Examiner* — Zixuan Zhou (57) ABSTRACT

The disclosure describes technology that includes a charge-port capture detection mechanism, which has a mounting base and a capture gate. The mounting is connectable to a battery electric vehicle (BEV) at a location adjacent to a high-voltage, direct current (HVDC) charge-port. The capture gate is movably attached to the mounting base, the capture gate being moveable, relative to the mounting base, between a closed position in which the capture gate captures a charge connector of a charging cable engaged in the HVDC charge-port and an open position.

20 Claims, 9 Drawing Sheets

FIG. 16

CHARGE-PORT CAPTURE DETECTION MECHANISM FOR BATTERY ELECTRIC VEHICLE

TECHNICAL FIELD

The present disclosure generally relates to the operation and charging of a battery pack, and more particularly, to the safe operation of and charging of an externally charged battery pack of associated with a battery electric vehicle (BEV).

BACKGROUND

A BEV is a type of electric vehicle having an energy source derived from one or more onboard battery packs that are recharged from an external charging source. Some BEVs are externally charged via an external electric vehicle supply equipment (EVSE) across a cable linking the EVSE to the BEV. In some instances, the EVSE may be an external high-voltage, direct current (HVDC) power source. Unfortunately, when an HVDC power source charges the battery pack of the BEV, a potentially hazardous degree of electrical voltage and current (HV power) is involved. This is sufficiently hazardous to cause damage to equipment and/or an operator of such equipment.

To address this, some charge-cable connectors employ a high voltage interlock loop (HVIL) circuit to protect against unintended access to the HV power of the charge-cable connector. The HVIL circuit is energized by relatively low-voltage power and is provided to protect against unintentional exposure to the HV power generally. Specifically, if the HVIL circuit experiences a change in electrical characteristics (e.g., an open circuit condition) indicating potential exposure to the HV power, then the HVDC power source is disconnected from the battery pack.

The conventional HVIL circuits are designed to detect a disengagement and signal that the charging should cease. However, the time required for the arc potential to dissipate is likely longer than the time afforded from the HVIL system to open internal contactors and thus signal that charging should cease. Therefore, HVIL circuits cannot prevent the danger of an arc flash when the operator removes the charge connector on the order of tens of milliseconds.

Another approach includes the use of internal locking clips in the charge-cable connectors. The internal locking clip locks the connector in-place to the charging outlet of the BEV while the HVDC power source charges the battery pack. To remove the connector, the operator must press a push-button mechanism of the internal locking clips. This action sends a signal to the HVDC power source to cease the charging and physically releases the connector from an outlet of the BEV so that the operator can remove the connector.

The conventional internal push-button locking clips are known to break. Of course, in that situation, the operator can remove the charge connector unimpeded. Especially with HV power, the charge connector is large to accommodate the HV power transmission and their electrical connections. In these instances, the connector may have no room to accommodate an internal locking clip, and there may be no room for an operator to access a push-button on such a connector. So, there is a need for an additional mechanism to reduce the risk to an operator from removing a charge connector from the HVDC charge-port of the BEV.

For example, as described in U.S. Pat. No. 10,046,661 (hereinafter, "the '661 patent), is a system that detects a physical connection between charge connectors of charge cables from an external power supply with a charge-port of an electric vehicle.

However, the system described in the '661 patent may not be sufficient to ensure safe disengagement of the charge-cable connectors, especially as the HVDC power source delivers significant HV power. For instance, the detection system of the '661 patent relies on a pilot signal between the HVDC charge-port of the electric vehicle and its charge connectors. The detection system determines that the physical connection is severed when that pilot signal is lost.

However, there is an unavoidable time gap between a physical disconnection and the detection of a loss of the pilot signal that is indicative of that disconnection. This is especially true when the operation quickly removes the charge connector. During this time gap, an arc flash may occur. This is especially dangerous when an HVDC power source is used. As a result, the detection system of the '661 patent cannot prevent a quick removal of a charge connector, and thus, the operator and equipment are subject to damage caused by an arc flash during the time gap between removal and detection.

Example embodiments of the present disclosure are directed toward overcoming the deficiencies described above.

SUMMARY

In an aspect of the present disclosure, a charge-port capture detection mechanism includes a mounting base and a capture gate. The mounting base is connectable to a battery electric vehicle (BEV) at a location adjacent to a high-voltage, direct current (HVDC) charge-port. The capture gate movably attached to the mounting base. The capture gate is moveable, relative to the mounting base, between a closed position, in which the capture gate captures a charge connector of a charging cable engaged in the HVDC charge-port, and an open position.

In another aspect of the present disclosure, a BEV in includes an externally rechargeable battery pack, an HVDC charge-port, and a charge-port capture detection mechanism. The HVDC charge-port has a receptacle to engage a charge connector of a charging cable from an external HVDC power source. The charge-port capture detection mechanism includes a mounting base and a capture gate. The mounting base is connectable to a BEV at a location adjacent to the HVDC charge-port. The capture gate is movably attached to the mounting base, the capture gate being moveable, relative to the mounting base, between a closed position and an open position, In the closed position, the capture gate is configured to capture the charge connector engaged in the HVDC charge-port, thereby prohibiting removal of the charge connector from the HVDC charge-port. In the open position, the capture gate is configured to remain free from the charge connector engaged in the HVDC charge-port, thereby permitting removal of the charge connector from the HVDC charge-port.

In yet another aspect of the present disclosure, a method includes obtaining a gate-release indication that a capture gate has transitioned from a closed position to an open position. In the closed position, the capture gate is configured to capture the charge connector engaged in the HVDC charge-port, thereby prohibiting removal of the charge connector from the HVDC charge-port. In the open position, the capture gate is configured to remain free from the charge connector engaged in the HVDC charge-port, thereby permitting removal of the charge connector from the HVDC charge-port. Such a method further includes in response to the gate-release indication, disabling charging of an externally rechargeable battery pack via the HVDC charge-port of the BEV.

The following detailed description of the drawings provides references to the accompanying figures. In the figures, the left-most digit(s) of a reference number identifies the figure in which the reference number first appears. The use of the same reference numbers in different figures indicates similar or identical items. The systems depicted in the accompanying figures are not to scale, and components within the figures may be depicted not to scale with each other.

DETAILED DESCRIPTION

This disclosure describes technology related to a charge-port capture detection mechanism of a BEV. With the techniques described herein, while an external HVDC power source is actively charging the onboard battery pack of the BEV, an operator is forced to manually extricate a gate of a mechanism that captures a charge connector of a charging cable when that charge connector is engaged in an HVDC charge-port of the BEV. This configuration requires the operator to move the gate of the mechanism to disengage the engaged charge connector. Moreover, sensors are integrated into the mechanism to signal that the charging should be ceased when the gate of the mechanism is removed.

Figure 1:
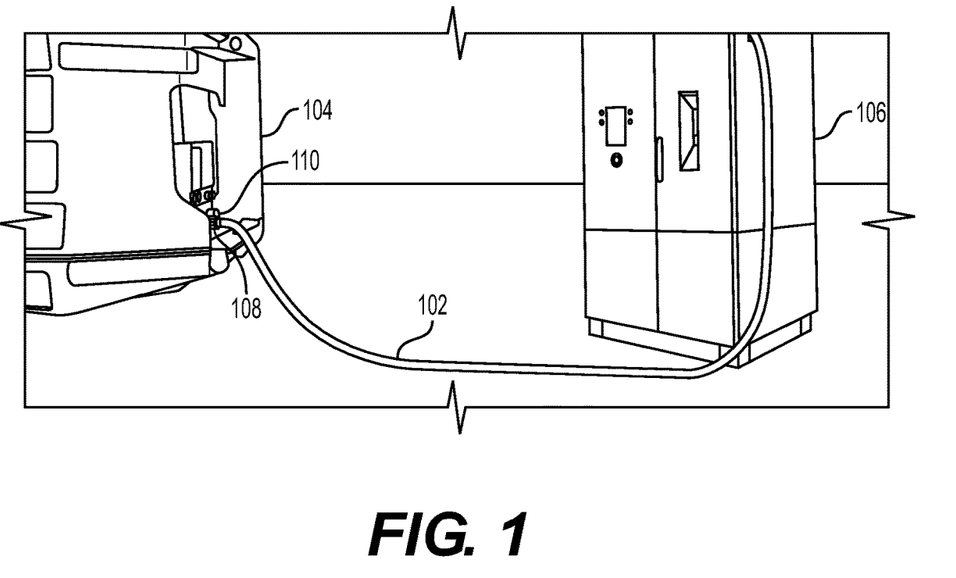
FIGS. 1-3 illustrate an example system of the present disclosure, including a BEV.
Figure 2:
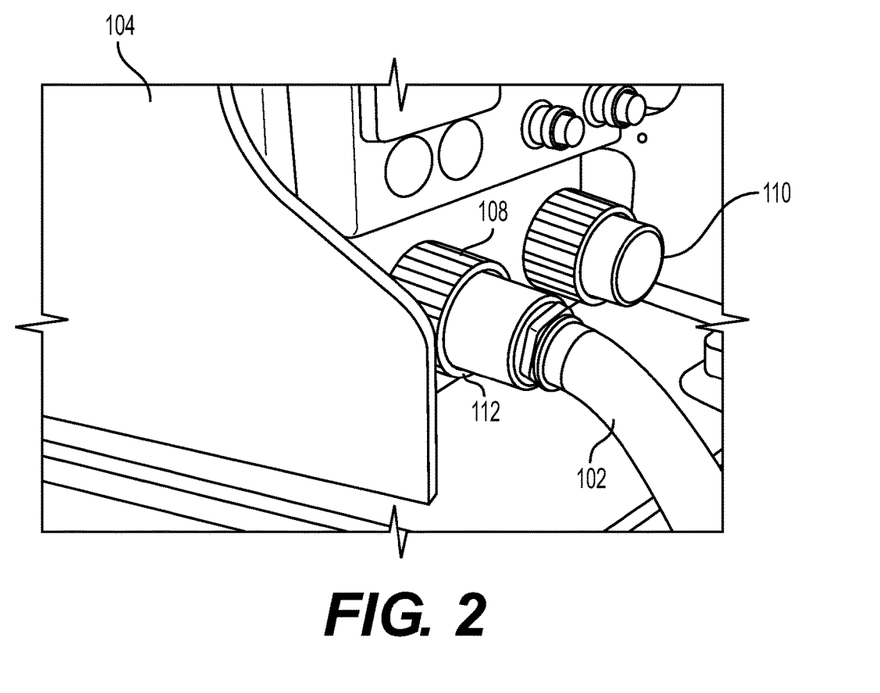
Figure 3:
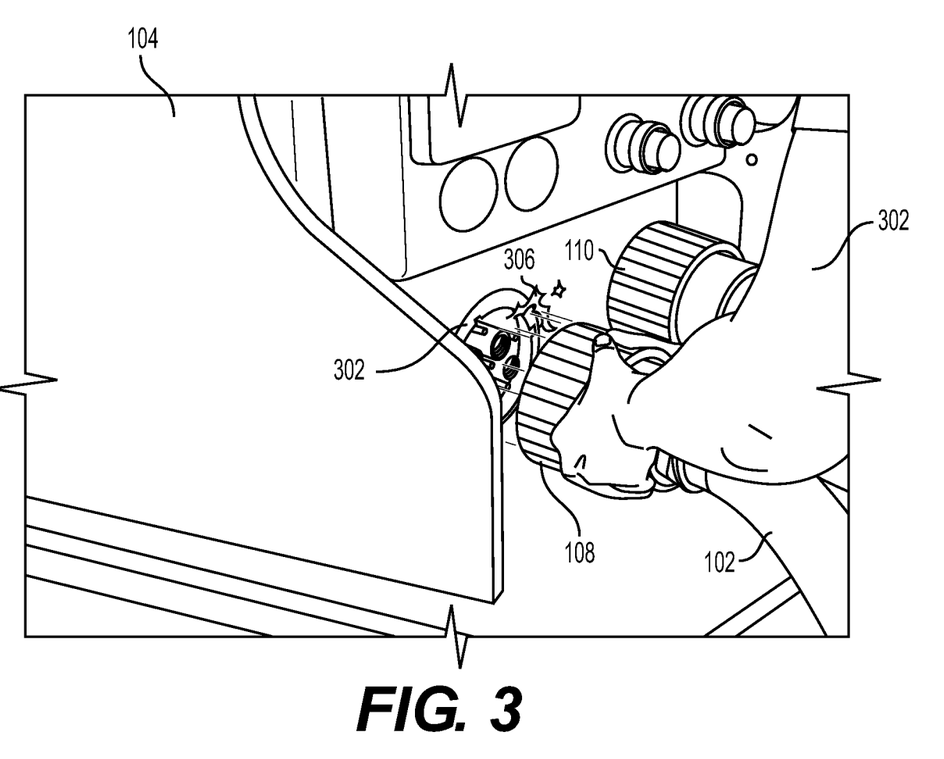

FIGS. 1, 2, and 3 illustrate an example arrangement in which an implementation of the technology described herein may be employed. FIGS. 1 and 2 show a charging cable 102, a BEV 104, an external HVDC power source 106, a charge connector 108, and an HVDC charge-port cap 110. In addition, FIG. 3 shows one of two HVDC charge-ports (e.g., HVDC charge-port 302) of the BEV 104, and an operator 304 disconnecting the charging cable 102 from the HVDC charge-port 302.

When operating normally, the BEV 104 is the type of electric vehicle having an energy source derived from the onboard battery pack (not shown) that is recharged from an external HVDC power source, which is the external HVDC power source 106. In other instances, the BEV 104 may also have an alternative onboard energy source or form of propulsion (e.g., hydrogen fuel cells, internal combustion engine, etc.).

Examples of BEVs 104 include underground mining load-haul-dump (LHD) loader, excavators, backhoe, dragline excavator, bulldozers, graders, wheel tractor scraper, trenchers, loaders, tower cranes, pavers, compactors, telehandlers, feller bunchers, dump trucks, pile boring machine, pile driving machine, other construction equipment and vehicles, automobiles, trucks, buses, trains, trams, watercraft, amphibious vehicles, aircraft, drones, and the like.

The BEV 104 is externally charged via HVDC electric power transmission across the charging cable 102 that links the external HVDC power source 106 (i.e., power supply) to the HVDC charge-port 302 of the BEV 104. The HVDC power source 106 may be, for example, a diesel generator rated for 360-500 electric kilowatts (ekW) and delivering 308 to 600 volts via the charging cable 102 to charge the battery pack of the BEV 104. In other examples, the external HVDC power source 106 may be configured to deliver greater than or less than the range of power noted above. In still other examples, the external HVDC power source 106 may be a high-power AC-to-DC power converter.

As depicted, the BEV 104 has two HVDC charge-ports. One of the HVDC charge-ports is hidden from view in FIG. 3 by the HVDC charge-port cap 110, and the other HVDC charge-port 302 is shown in FIG. 3 after the charge connector 108 is disengaged by the operator 304. The HVDC charge-ports 302 are designed to receive HVDC electric power transmission from the external HVDC power source 106 via the charging cable 102 when the charge connector 108 is fully connected to the HVDC charge-ports 302. In other instances, the BEV 104 may have fewer or more HVDC charge-ports 302.

As depicted in FIG. 2, the charge connector 108 has a larger diameter than the charging cable 102. In some instances, the charge connector 108 may have a portion thereof that is larger than the charging cable 102. That portion may be called, for example, a grip.

The difference between differing diameters may produce a wall 112 between the charge connector 108 and the charging cable 102 or between the grip and the remainder of the charge connector 108. The wall 112 may be perpendicular or substantially perpendicular (e.g., less than thirty degrees) relative to a coaxial axis of the charge connector 108 and the charging cable 102.

FIG. 3 shows a moment immediately after the operator 304 has manually disengaged the charge connector 108 from the HVDC charge-port 302 while the external HVDC power source 106 is actively charging the battery pack of the BEV 104. This action may create an arc flash 306 that could damage the equipment and/or physically harm the operator 304.

Figure 4:
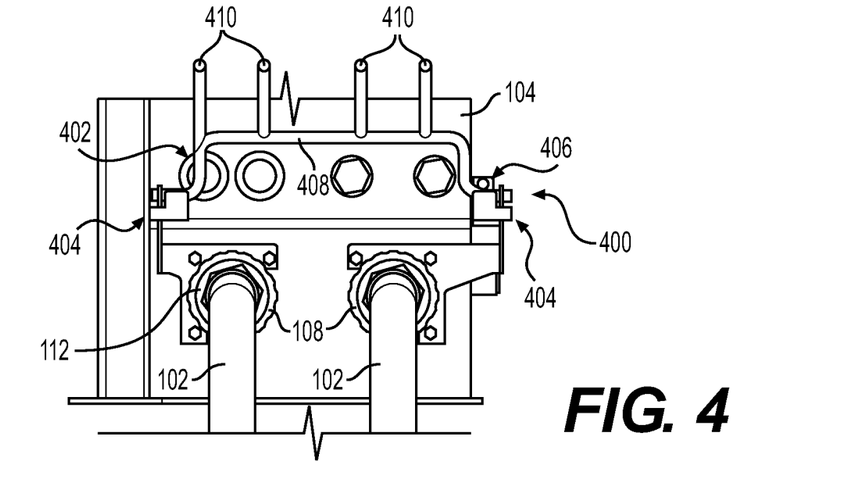
FIGS. 4-6 illustrate an example charge-port capture detection mechanism of an example BEV in accordance with the technology described herein.
Figure 5:
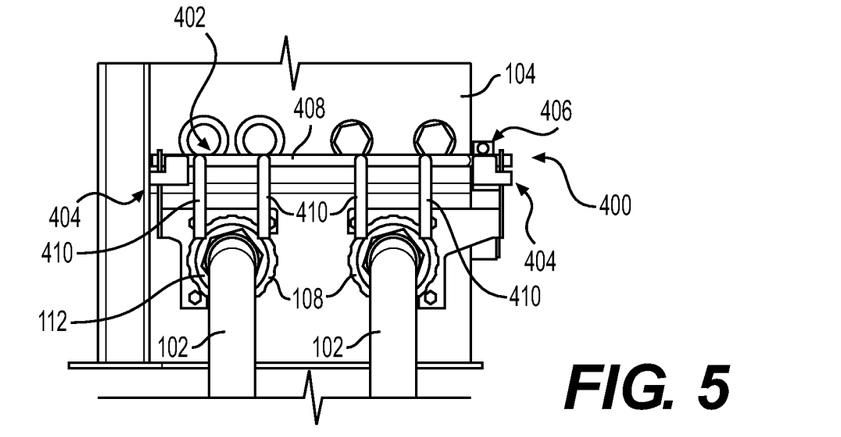
Figure 6:
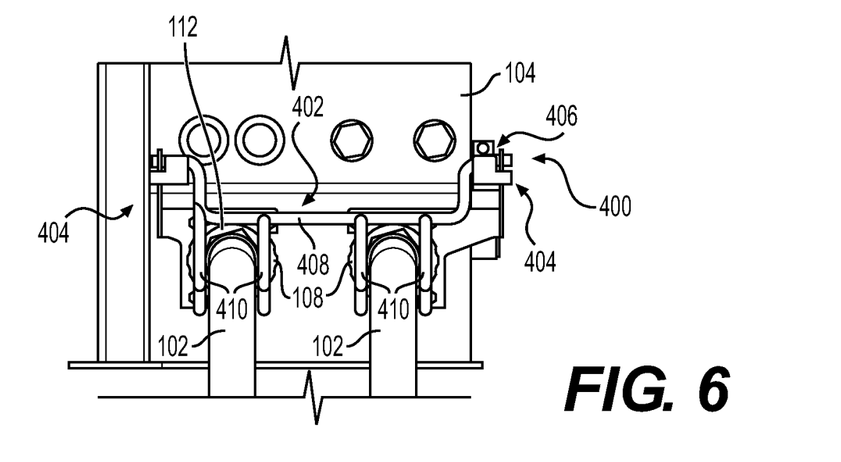

FIGS. 4-6 illustrate an example charge-port capture detection mechanism 400 in accordance with the technology described herein. FIGS. 4-6 show a cut-away elevation view of the region, shown in FIGS. 2 and 3, around the HVDC charge-ports (e.g., HVDC charge-port 302) of the BEV 104. FIGS. 4-6 show the charge-port capture detection mechanism 400 affixed to the BEV 104 above the two charge connectors (e.g., charge connector) 108 of the charging cables (e.g., charging cable 102). Each of the charging cable 102 are illustrated as being plugged into the HVDC charge-ports (e.g., HVDC charge-port 302) of the BEV 104.

The charge-port capture detection mechanism 400 includes a capture gate 402 and a mounting base 404. The capture gate 402 has a crossbar 408 with arms 410 that extend perpendicularly therefrom. The charge-port capture detection mechanism 400 also has a gate-position monitor 406 that detects the present position of the capture gate 402.

The mounting base 404 is connectable to the BEV 104 at a location adjacent to HVDC charge-port 302. As shown in FIGS. 4-6, the mounting base 404 is fixedly attached or mounted to the BEV 104 above and adjacent to the HVDC charge-ports 302. In other instances, the mounting base 404 may be affixed to the BEV 104 below and adjacent to the HVDC charge-ports 302.

The capture gate 402 is movably attached to the mounting base 404. The capture gate 402 is moveable, relative to the mounting base 404, between a closed position (shown in FIG. 6) and an open position (shown in FIG. 4).

FIG. 4 shows the capture gate 402 in a first or open position. In the open position, the capture gate 402 provides access to the charge connector 108 and/or the HVDC charge-ports (e.g., HVDC charge-port 302). Thus, the operator 304 may remove the engaged charge connector 108 of the charging cable 102 without hindrance from the charge-port capture detection mechanism 400. Similarly, when the HVDC charge-ports (e.g., HVDC charge-port 302) is empty, the operator 304 may plug the charge connector 108 into the empty HVDC charge-port 302 without any hindrance.

The open position is the position of the capture gate 402 when it is configured to remain free from the charge connector 108 as it is engaged in the HVDC charge-port 302. Thus, the open position permits removal of the charge connector 108 from the HVDC charge-port 302.

FIG. 6 shows the capture gate 402 in a second or closed position. In the closed position, the capture gate 402 closed onto the charge connector 108 and around the charging cable 102. In the closed position, the operator 304 cannot remove the engaged charge connector 108 of the charging cable 102. The capture gate 402 captures the engaged charge connector 108 of the charging cable 102.

The closed position is the position of the capture gate 402, where it is configured to capture the charge connector 108 of the charging cable 102 while the charge connector 108 is engaged in the HVDC charge-port 302. Thus, the closed position prohibits the removal of the charge connector 108 from the HVDC charge-port 302.

As depicted in FIG. 6, when in the closed position, the crossbar 408 and arms 410 of the capture gate 402 are proximate to and/or pressed against the wall 112. In this manner, the crossbar 408 and arms 410 prohibit the removal of the charge connector from the HVDC charge-port. 302. In other examples, the capture gate 402 might not have arms 410.

Instead, the crossbar 408 alone may prohibit removal of the charge connector from the HVDC charge-port. 302. In still other examples, the crossbar 408 may be shaped to fit around the contours of the charge connector 108 tightly, and in that way, the capture gate 402 may prohibit the removal of the charge connector from the HVDC charge-port. 302.

FIG. 5 shows the capture gate 402 in a third or transition position. In the transition position, the capture gate 402 is transitioning from the closed position to the open position. While in the transition position, the capture gate 402 may be released and may permit the operator 304 to disengage the charge connector 108 of the charging cable 102 from the HVDC charge-port 302.

Figure 7:
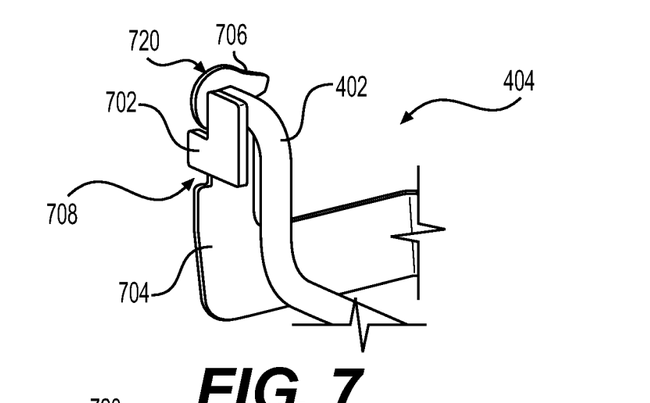
FIGS. 7-9 illustrate an example mounting base of an example charge-port capture detection mechanism.
Figure 8:
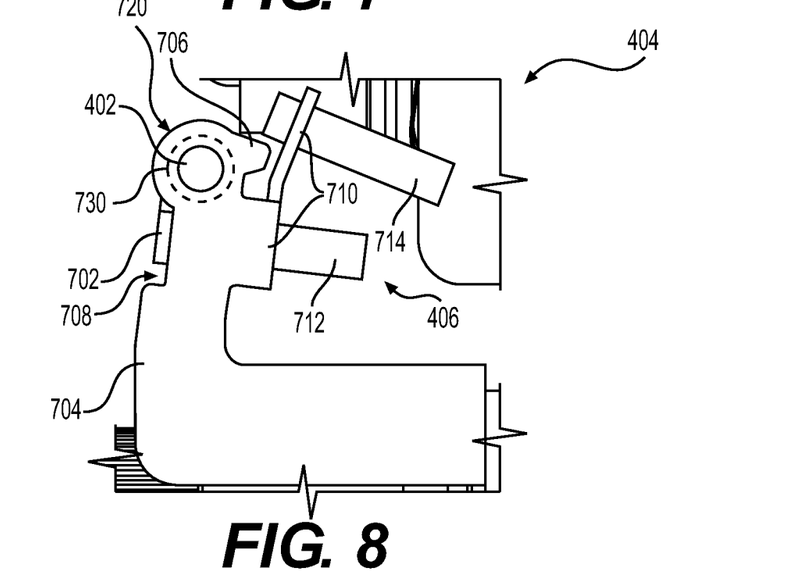
Figure 9:
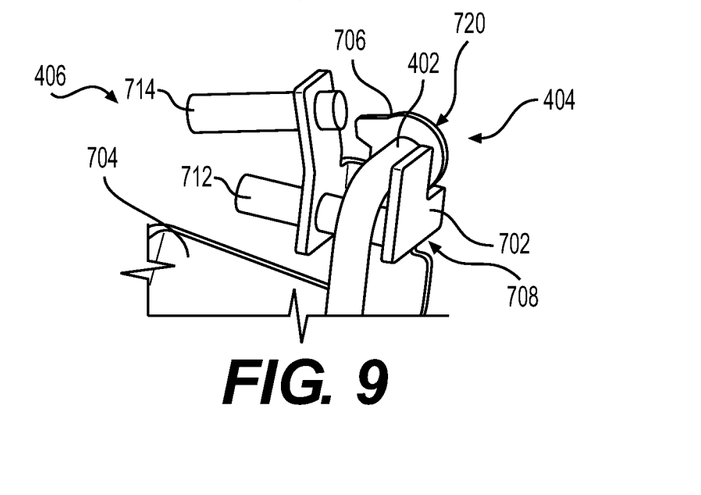

FIGS. 7-9 show the detail of an example of one of the mounting bases 404 of the charge-port capture detection mechanism 400 with the capture gate 402 shown in the closed position (as shown in FIG. 6). FIG. 7 shows a simplified isometric view of the example mounting base 404. FIG. 8 shows an elevation view of the example mounting base 404. FIG. 9 shows an isometric view of the example mounting base 404.

As depicted in FIGS. 7-9, the example mounting base 404 includes gate-position flag 702, mounting bracket 704, open-position stop 706, closed-position stop 708, sensor supports 710, hinge 720, and the gate-position monitor 406.

The mounting bracket 704 rigidly affixes the rest of the mounting base 404 to the BEV 104. The hinge 720 is an end of the capture gate 402 inserting into a shape conforming hole formed at the top of the mounting base 404. In this way, the capture gate 402 may swing up or down. That is, it may swing towards or away from the HVDC charge-ports (e.g., HVDC charge-port 302).

The hinge 720 is an example of a movable attachment with which the capture gate 402 is movably attached to the mounting base 404. The hinge 720 may include one or more hinges that enable the capture gate 402 to swing away from HVDC charge-port 302 in the open position and towards the HVDC charge-port 302 in the closed position. Examples of other suitable movable attachments that may be utilized to implement the charge-port capture detection mechanism 400, in accordance with the technology described herein, include a ball joint, sliding mechanism, swinging mechanisms, and the like.

In some instances, the hinge 720 may have a bias device 730 connected thereto or an integral part of. The bias device 730 may be, for example, a spring mechanism. Thus, the movable attachment (e.g., via the bias device 730 of the hinge 720) biases the capture gate in the closed position against the charge connector engaged in the HVDC charge-port.

The bias device 730 bias the capture gate 402 so that it will remain in the fully open position (like that of FIG. 4) or the fully closed position (like that of FIG. 6) without manual intervention. For example, the bias device 730 biases the capture gate 402 towards the closed position. That closed-position bias may be overcome when the operator 304 moves the capture gate 402 into the open position. Therefore, the capture gate 402 is in the transient position during the duration when the capture gate 402 moving from the closed position to the open position.

To unplug the engaged charge connector 108 of the charging cable 102 with the capture gate 402 in the closed position, the operator 304 must lift or open the capture gate 402. The bias device 730 of the movable attachment (e.g., hinge 720) is designed to bias the capture gate 402 onto the engaged charge connector 108 of the charging cable 102 and/or onto the charging cable 102 of the engaged charge connector 108 to hinder the transition.

The time required to 1) move the capture gate 402 from the closed to the open position and 2) unplug the engaged charge connector 108 of the charging cable 102 is enough to safely reduce current and prevent the potential for the arc flash 306 once the connector is unplugged. Thus, the charge-port capture detection mechanism 400 is designed to hinder the operator so that the minimum time duration required for the operator to move the gate and unplug the engaged charge connector is twenty milliseconds (20 ms) or more. In some instances, the duration may be eight to twelve milliseconds (8-12 ms) or more. For example, the movable attachment may offer resistance to manual manipulation by the operator to transition the capture gate 402 out of the closed position and into the transitory position. Indeed, that resistance may cause the transition to take at least twelve milliseconds.

The gate-position monitor 406 includes a closed-position sensor 712, and an open-position sensor 714. And the name implies, the sensor supports 710 holds the closed-position sensor 712 and the open-position sensor 714. These sensors are part of the gate-position monitor 406 that determines the position of the capture gate 402 of the charge-port capture detection mechanism 400.

The sensor supports 710 holds or supports the closed-position sensor 712 in a location near the closed-position stop 708 so that the closed-position sensor 712 can detect the immediate proximity of the gate-position flag 702. The sensor supports 710 holds or supports the open-position sensor 714 in a location near the open-position stop 706 so that the open-position sensor 714 can detect the immediate proximity of the gate-position flag 702.

As depicted in FIGS. 7-9, the gate-position flag 702 is a metal tag that is attached to or is an integral part of the capture gate 402. The closed-position stop 708 is formed by an indention between the mounting bracket 704 and the hinge 720. The closed-position stop 708 prevents the capture gate 402 from swinging down more. More particularly, when gate-position flag 702 is in this indention, which is the closed-position stop 708, the capture gate 402 is in the closed position, as shown in FIG. 6.

In this closed position, the closed-position sensor 712 detects the immediate proximity and/or contact of the gate-position flag 702 thereto. If so, the gate-position monitor 406 generates a gate-closed indication.

The open-position stop 706 is a tab extending from the hinge 720 that prevents the capture gate 402 from swinging up and away from the HVDC charge-port 302. When gate-position flag 702 is near the open-position stop 706, the capture gate 402 is in the open position, as shown in FIG. 4.

In this open position, the open-position sensor 714 detects the immediate proximity and/or contact of the gate-position flag 702 thereto. If so, the gate-position monitor 406 generates a gate-open indication.

The close-position sensor 712 and the open-position sensor 714 may be implemented using, for example, inductive sensors. In other instances, other proximity sensors may be employed, such as infrared, photoelectronic, capacitive, and the like.

The gate-position monitor 406 indicates engagement of the charge connector 108 of the charging cable 102 in response to the gate-position monitor detecting the present position of the capture gate being closed. The closed-position sensor 712 is positioned adjacent to the HVDC charge-port 302 and at an end of a path of travel (which is closed-position stop 708) of the capture gate 402 towards the HVDC charge-port 302. The closed-position sensor 712 is configured to detect presence of the capture gate and, in response, indicate that the present position of the capture gate is closed.

The gate-position monitor 406 indicates disengagement of the charge connector 108 of the charging cable 102 in response to the gate-position monitor detecting the present position of the capture gate being open. The open-position sensor 714 is positioned at an end of a path of travel (which is the open-position stop 706) of the capture gate 402 from the HVDC charge-port 302. The open-position sensor 714 is configured to detect presence of the capture gate and, in response, indicate that the present position of the capture gate is open.

Figure 10:
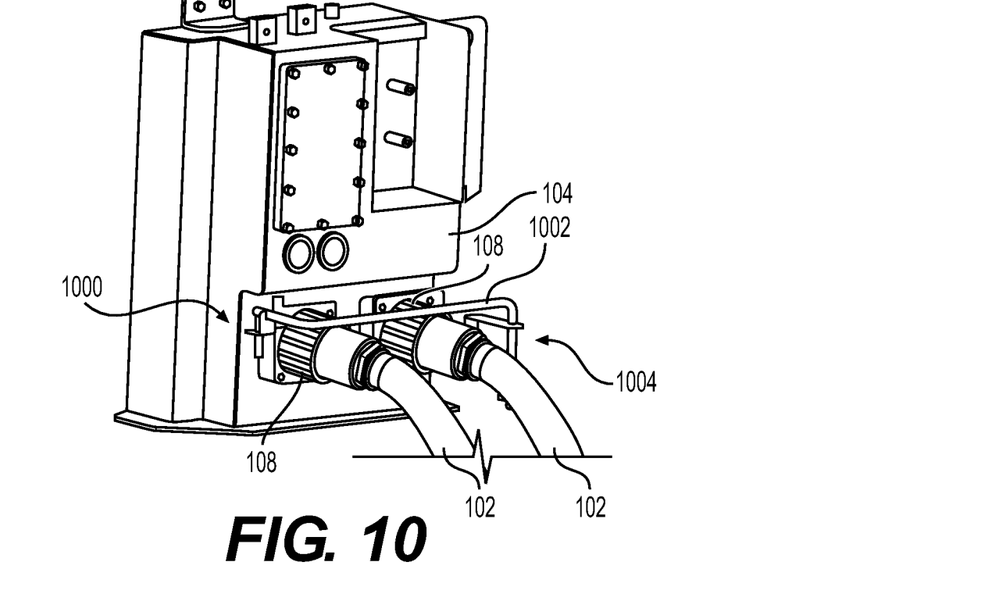
FIGS. 10 and 11 illustrate another example charge-port capture detection mechanism in accordance with the technology described herein.
Figure 11:
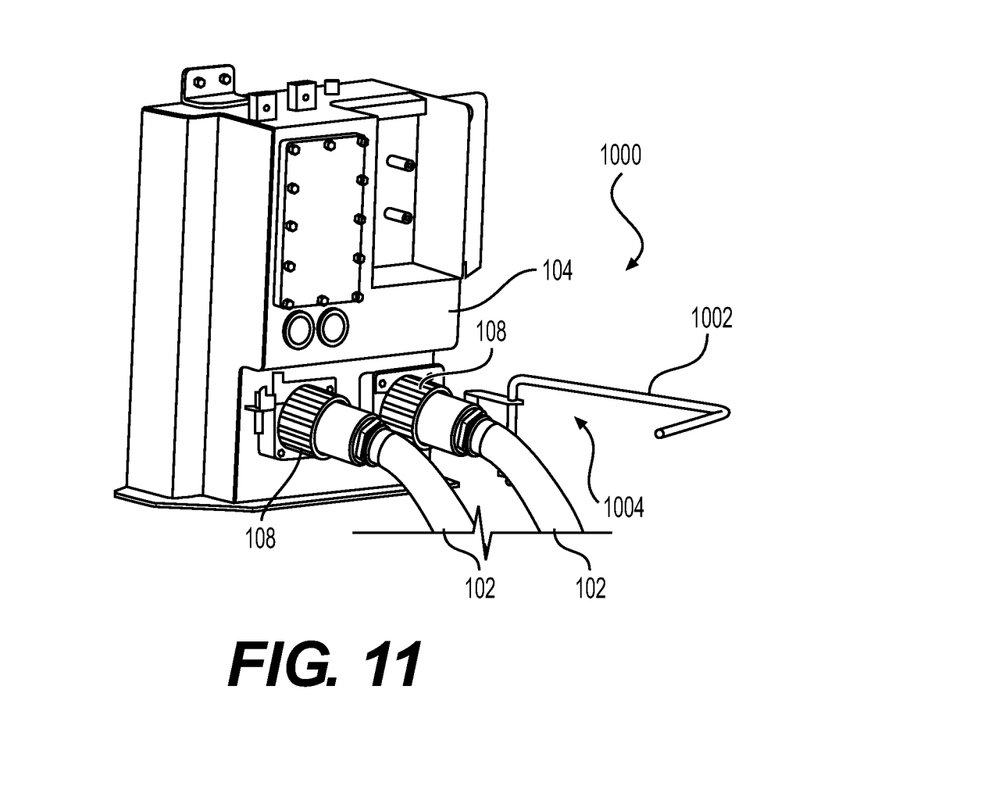

FIGS. 10 and 11 illustrate another example charge-port capture detection mechanism 1000 in accordance with the technology described herein. FIGS. 10 and 11 show a cut-away isometric view of the region, shown in FIGS. 2 and 3, around the charge-ports (e.g., HVDC charge-port 302) of the BEV 104.

FIGS. 10 and 11 show the charge-port capture detection mechanism 1000 affixed to the BEV 104 above the two charge connectors (e.g., charge connector) 108 of the charging cables (e.g., charging cable 102). The charge connector 108 is plugged into the charge-ports (e.g., HVDC charge-port 302) of the BEV 104. The charge-port capture detection mechanism 1000 includes a capture gate 1002 and a mounting base 1004. The charge-port capture detection mechanism 1000 also has a gate-position monitor (not shown in FIGS. 10 and 11) that detects the present position of the capture gate 1002.

As depicted in FIGS. 4-9, the capture gate 402 of the charge-port capture detection mechanism 400 is hinged to swing or fold up and down relative to the engaged charge connector 108 of the charging cable 102. In contrast, the capture gate 1002 of the charge-port capture detection mechanism 1000, as depicted in FIGS. 10 and 11, is hinged to swing in and out relative to the engaged charge connector 108 of the charging cable 102.

FIG. 10 shows the capture gate 1002 in the second or closed position. In the closed position, the capture gate 1002 is closed onto the charge connector 108 and the charging cable 102. In the closed position, the operator cannot remove the engaged charge connector 108 of the charging cable 102. The capture gate 1002 captures the engaged charge connector 108 of the charging cable 102. When the gate-position monitor detects that the capture gate 1002 is in the closed position, it generates a gate-closed indication.

FIG. 11 shows the capture gate 1002 the first or open position. In the open position, the capture gate 1002 does not block access to the charge connector 108 and/or the charge-ports (e.g., HVDC charge-port 302). Thus, the operator may remove the engaged charge connector 108 of the charging cable 102 without any hindrance. When the gate-position monitor detects that the capture gate 1002 is in the open position, it generates a gate-open indication to a safety system of the BEV 104.

While it is not shown, the capture gate 1002 has a third or transition position in between the closed and open positions shown in FIGS. 10 and 11, respectively. In the transition position, the capture gate 1002 is specifically transitioning from the closed position to the open position. Herein, the transition position represents the capture gate 1002, having just been released and now allowing for the operator to disengage the engaged charge connector 108 of the charging cable 102. When the gate-position monitor detects that the capture gate 1002 is in the transition position, it generates a gate-release indication.

Figure 12:
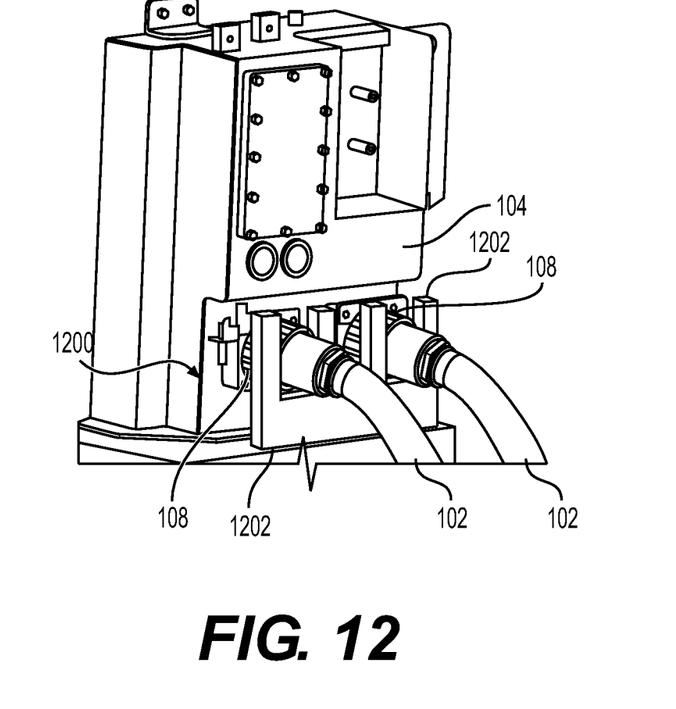
FIGS. 12 and 13 illustrate still another example charge-port capture detection mechanism in accordance with the technology described herein.
Figure 13:
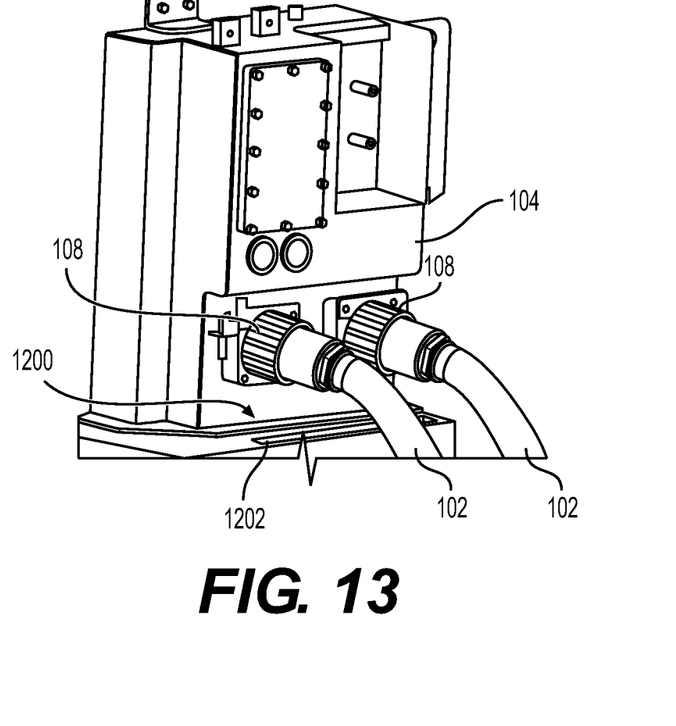

FIGS. 12 and 13 illustrate still another example charge-port capture detection mechanism 1200 in accordance with the technology described herein. FIGS. 12 and 13 show a cut-away isometric view of the region, shown in FIGS. 2 and 3, around the charge-ports (e.g., HVDC charge-port 302) of the BEV 104.

FIGS. 12 and 13 show the charge-port capture detection mechanism 1200 fixed to the BEV 104 below the two charge connectors (e.g., charge connector) 108 of the charging cables (e.g., charging cable 102). The charge connector 108 is plugged into the charge-ports (e.g., HVDC charge-port 302) of the BEV 104. Indeed, the charge-port capture detection mechanism 1200 is embedded and recessed into an enclosure of the BEV 104.

The charge-port capture detection mechanism 1200 includes a capture gate 1202 that functions as a sliding door. Its mounting base (not shown) is recessed into the enclosure of the BEV 104. The charge-port capture detection mechanism 1200 also has a gate-position monitor (not shown in FIGS. 12 and 13) that detects the present position of the capture gate 1202.

As depicted in FIGS. 4-9, the capture gate 402 of the charge-port capture detection mechanism 400 is hinged to swing or fold up and down relative to the engaged charge connector 108 of the charging cable 102. In contrast, the capture gate 1202 of the charge-port capture detection mechanism 1200, as depicted in FIGS. 12 and 13, is recessed mounted so as to slide up and down relative to the engaged charge connector 108 of the charging cable 102.

FIG. 12 shows the capture gate 1202 in the second or closed position. In the closed position, the capture gate 1202 is closed onto and over the charge connector 108 and the charging cable 102. In the closed position, the operator cannot remove the engaged charge connector 108 of the charging cable 102, The capture gate 1202 captures the engaged charge connector 108 of the charging cable 102. When the gate-position monitor detects that the capture gate 1202 is in the closed position, it generates a gate-closed indication.

FIG. 13 shows the capture gate 1202 the first or open position. In the open position, the capture gate 1202 does not block access to the charge connector 108 and/or the charge-ports (e.g., HVDC charge-port 302). Indeed, the capture gate 1202 is barely visible because it is recessed into the enclosure of the BEV 104. In this open position, the operator may remove the engaged charge connector 108 of the charging cable 102 without any hindrance. When the gate-position monitor detects that the capture gate 1202 is in the open position, it generates a gate-open indication.

While it is not shown, the capture gate 1202 has a third or transition position in between the closed and open positions shown in FIGS. 12 and 13, respectively. In the transition position, the capture gate 1202 is specifically transitioning from the closed position to the open position. Herein, the transition position represents the capture gate 1202, having just been released and now allowing for the operator to disengage the engaged charge connector 108 of the charging cable 102. When the gate-position monitor detects that the capture gate 1202 is in the transition position, it generates a gate-release indication.

Figure 14:
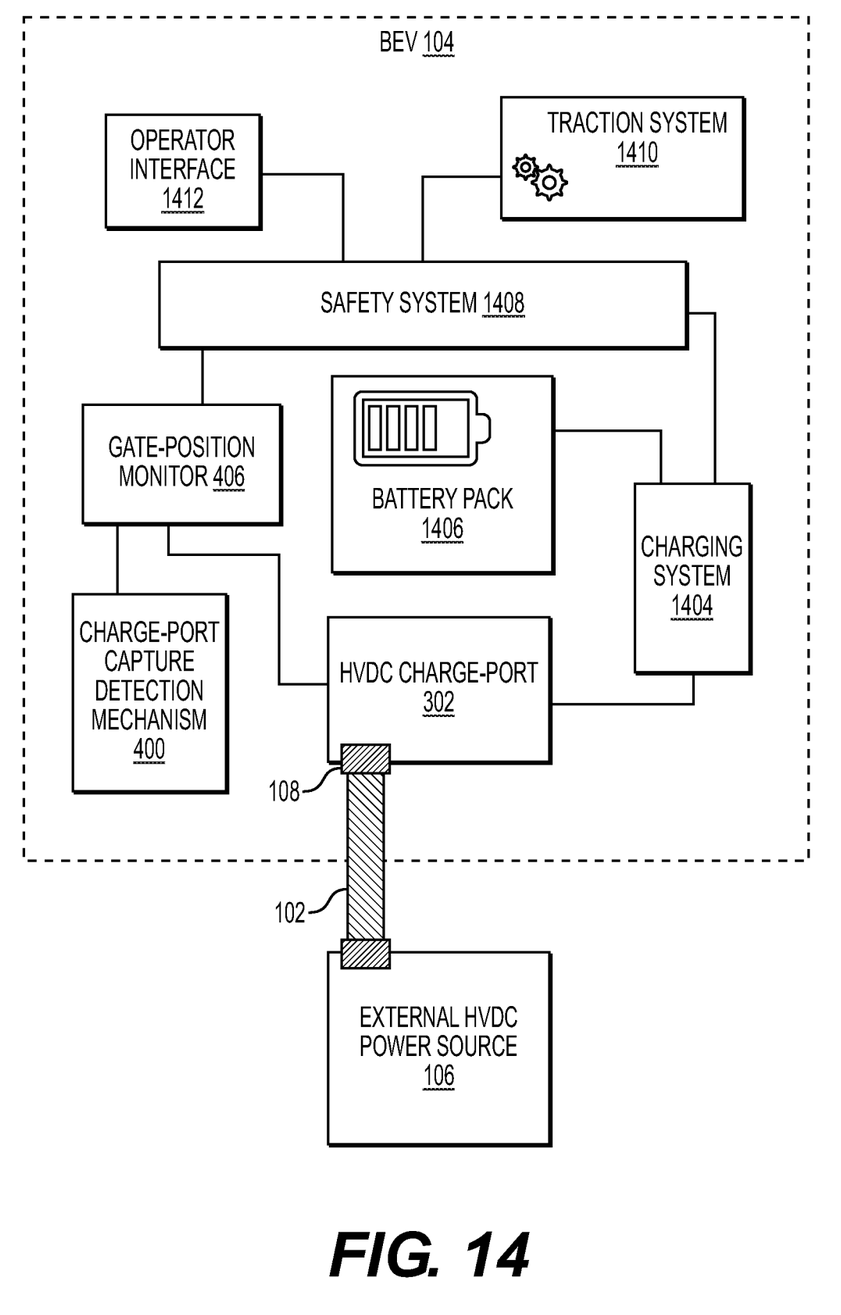
FIG. 14 illustrates a schematic diagram of a BEV connected to an external power supply in accordance with the technology described herein.

FIG. 14 illustrates a schematic diagram of systems and components of the BEV 104 that are relevant and suitable to the technology described herein. FIG. 14 shows the following systems and components of the BEV 104: The charge-port capture detection mechanism 400, a gate-position monitor 406, the HVDC charge-port 302, a charging system 1404, a rechargeable battery pack 1406, a safety system 1408, a traction system 1410, and an operator interface 1412. FIG. 14 also shows the external HVDC power source 106 actively charging the rechargeable battery pack 1406 of the BEV 104 via the charging cable 102 and the engaged charge connector 108.

The rechargeable battery pack 1406 is externally charged by the external HVDC power source 106 that is connected to the BEV 104 by one or more charge connector 108 of the charging cable 102 engaged into the HVDC charge-port 302. The HVDC charge-port 302 is configured for removable connection with the charge connector 108 of the charging cable 102 from the external HVDC power source 106. That is, the HVDC charge-port 302 has a receptacle to engage the charge connector 108 of the charging cable 102 from the external HVDC power source 106.

The charging system 1404 manages the charging process. More particularly, the charging system activates the internal charging process that enables the rechargeable battery pack 1406 to be charged. In some instances, it generates a signal to the external HVDC power source 106 to initiate the charging process. Depending on the conditions (such as safety), the charging system may engage or disengage the charging process.

The traction system 1410 includes the traction or locomotion functional components of the BEV 104. That is, the traction system 1410 enable or disables the ability of the BEV 104 to move or its equipment to operate. Depending on the conditions (such as safety), the traction system 1410 allows, for example, the wheels to turn and the BEV 104 to move and/or the engine to operate. In other instances, for example, the traction system 1410 may, depending on the conditions, may allow or disallow mechanical equipment of the BEV 104 to operate.

The operator interface 1412 presents information to the operator 304 and/or allows for the operator to provide input. The presented information may be related to the present conditions and/or statuses of the BEV 104. Examples of such conditions and statuses include safe, unsafe, traction enabled, traction disabled, charging enabled, charging disabled, charging allowed, charging not allowed, charge connector engaged, charge connector disengaged, capture-gate closed, capture-gate open, HVDC charge-port cap on, and HVDC charge-port cap off.

The safety system 1408 determines a present safety state of the BEV 104. For example, when the capture gate is closed, and the charge connector is engaged, the safety system 1408 determines that the safety state is safe. Thus, the safety system 1408 may direct the charging system 1404 to activate the internal charging process that enables the rechargeable battery pack 1406 to be charged. If the present safety state is unsafe, the safety system 1408 may direct the charging system to deactivate the internal charging process and disable the traction system 1410.

As depicted in FIG. 14, the safety system 1408 obtains a gate-release indication from the gate-position monitor 406. The gate-release indication indicates that the capture gate 402 of the charge-port capture detection mechanism 400 has transitioned from the closed position (as shown in FIG. 6) to the open position (as shown in FIG. 4). In other words, the gate-release indication indicates that the capture gate 402 is in the transition position (as shown in FIG. 5). The gate-release indication may be, for example, a signal or a unique code sent by the gate-position monitor 406 in response to the gate-position monitor detecting that the capture gate 402 has moved from its closed position.

In response to the gate-release indication, the safety system 1408 disables or ceases the charging of the externally rechargeable battery pack 1406 via the HVDC charge-port 302 of the BEV 104. The safety system 1408 may accomplish this by directing the charging system 1404 to disables or ceases the charging process.

As depicted in FIG. 14, the safety system 1408 obtains a gate-open indication from the gate-position monitor 406. The gate-open indication indicates that the capture gate 402 of the charge-port capture detection mechanism 400 has is in the open position (as shown in FIG. 4). The gate-open indication may be, for example, a signal or a unique code sent by the gate-position monitor 406 in response to the monitor detecting that the capture gate 402 is in the open position.

In response to the gate-open indication, the safety system 1408 disables or ceases the traction system 1410 of the BEV 104. The safety system 1408 may accomplish this by directing the traction system 1410 of the BEV 104 to stop functioning.

As depicted in FIG. 14, the safety system 1408 obtains a gate-closed indication from the gate-position monitor 406. The gate-closed indication indicates that the capture gate 402 of the charge-port capture detection mechanism 400 has is in the closed position (as shown in FIG. 6). The gate-closed indication may be, for example, a signal or a unique code sent by the gate-position monitor 406 in response to the monitor detecting that the capture gate 402 is in the closed position.

In response to the gate-closed indication, the safety system 1408 enable or initiate the charging of the externally rechargeable battery pack 1406 via the HVDC charge-port 302 of the BEV 104. The safety system 1408 may accomplish this by directing the charging system 1404 to enable or initiate the charging process.

In addition, in response to the gate-closed indication, the safety system 1408 may disable or cease the traction system 1410 of the BEV 104. The safety system 1408 may accomplish this by directing the traction system 1410 of the BEV 104 to stop functioning.

As depicted in FIG. 14, the safety system 1408 may obtain an indication that the capture gate is in a second closed position from the gate-position monitor 406. This indicates that the capture gate 402 of the charge-port capture detection mechanism 400 has is in a second closed position (not shown). This capture gate 402 is in this second closed position when the gate is closed (like as shown in FIG. 6) over HVDC charge-port caps 110 over each HVDC charge-port 302 rather than over engaged charge connector 108 of the charging cable 102. No cables connected to the HVDC charge-ports 302 and the protective HVDC charge-port caps 110 are covering them.

In this instance, this may be determined by an additional sensor to detect the HVDC charge-port cap 110 being in place. This additional sensor may detect the presence of the cap directly or a slightly different closed position of the capture gate 402.

In response to the indication that the capture gate is in a second closed position, the safety system 1408 may enable or initiate the traction system 1410 of the BEV 104 and disable or cease the charging of the externally rechargeable battery pack 1406 via the HVDC charge-port 302 of the BEV 104.

The charging system 1404, safety system 1408, traction system 1410, and operator interface 1412 may be implemented by mechanisms, logic, circuitry, electrical hardware, processors, electronic control module, engine control module, integrated circuitry, computer hardware, and/or firmware. In some implementations, these systems may be implemented using a combination of computer hardware and software (e.g., processor-executable instructions).

Figure 15:
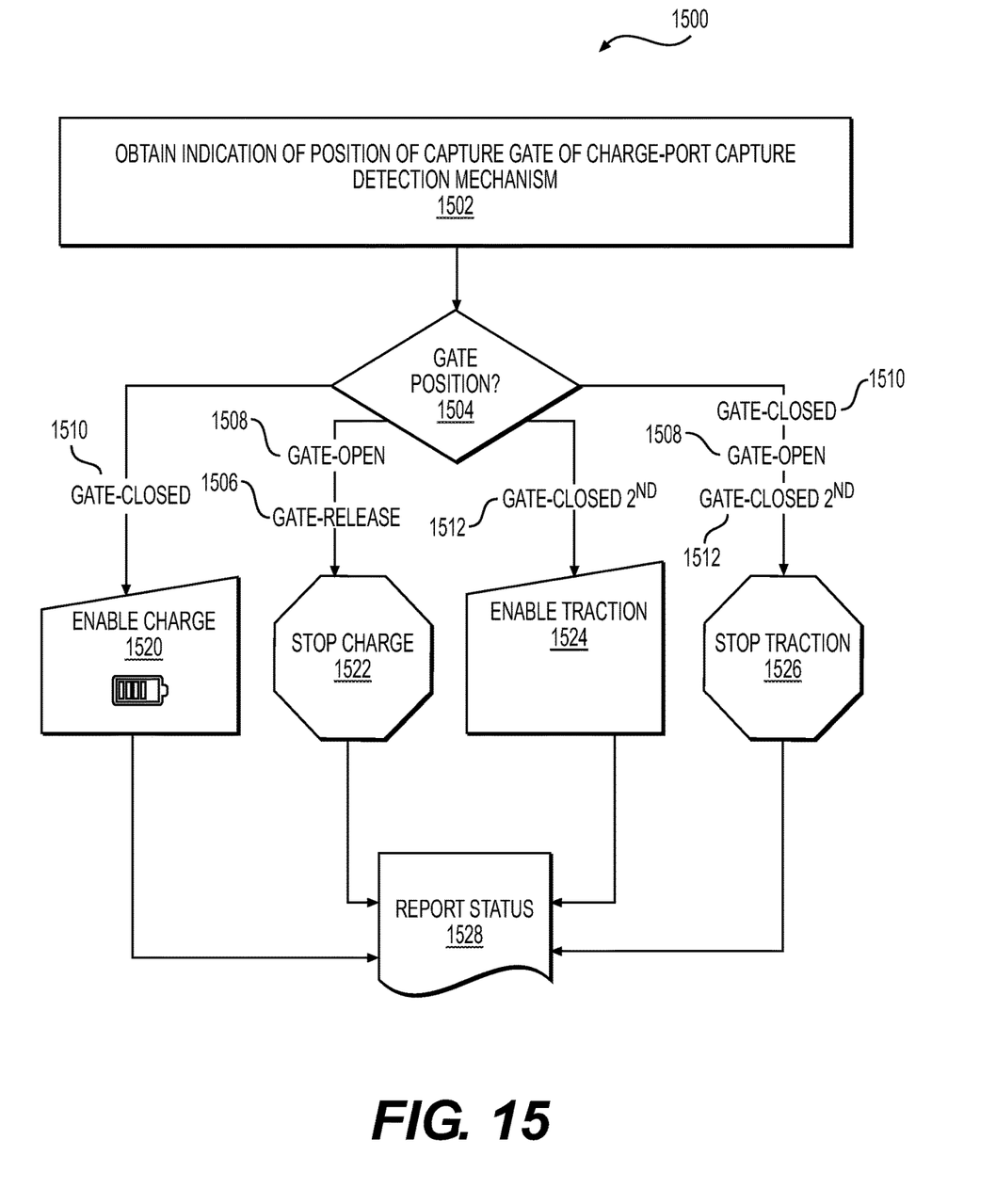
FIG. 15 is a flowchart that illustrates an example process of detecting the position of a capture gate.

FIG. 15 is a flowchart that illustrates an example process 1500 that facilitates the detection of the position of the capture gate 402 of the charge-port capture detection mechanism 400 for the BEV 104. The detected position of the capture gate indicates whether the operator will be physically hindered from unplugging the engaged charge connector 108 of the charging cable 102 from the HVDC charge-port 302.

The example process 1500 is illustrated as a collection of steps in a logical flow diagram, which represents operations that can be implemented in hardware, software, or a combination thereof. In the context of software, the steps represent processor-executable instructions stored in memory. When such instructions are executed by, for example, one or more processors, such instructions may cause the charging system 1404, the safety system 1408, the traction system 1410, and/or the operator interface 1412 to perform the recited operations. Such processor-executable instructions may include routines, programs, objects, components, data structures, and the like that perform particular functions or implement particular abstract data types. The order in which the operations are described is not intended to be construed as a limitation, and any number of the described steps can be combined in any order and/or in parallel to implement the process 1500.

At 1502, one or more processors obtain a gate-position indication from the gate-position monitor 406. The gate-position indication is a signal or message that indicates in which position that the capture gate 402 is.

At 1504, one or more processors determine which position that the gate is in based on the gate-position indication received from the gate-position monitor 406. The gate-position indication may be a gate-release indication 1506, a gate-open indication 1508, a gate-closed indication 1510, or a gate-closed indication 1510.

The gate-release indication 1506 indicates that the capture gate 402 of the charge-port capture detection mechanism 400 has transitioned from the closed position (as shown in FIG. 6) to the open position (as shown in FIG. 4). In other words, the gate-release indication indicates that the capture gate 402 is in the transition position (as shown in FIG. 5). The gate-position monitor 406 may generate the gate-release indication 1506 when the closed-position sensor 712 does not sense the capture gate 402 and the open-position sensor 714 does not sense the capture gate 402.

The gate-open indication 1508 indicates that the capture gate 402 of the charge-port capture detection mechanism 400 has is in the open position (as shown in FIG. 4). The gate-position monitor 406 may generate the gate-open indication 1508 when the closed-position sensor 712 does not sense the capture gate 402 and the open-position sensor 714 does sense the capture gate 402.

The gate-closed indication 1510 indicates that the capture gate 402 of the charge-port capture detection mechanism 400 has is in the closed position (as shown in FIG. 6). The gate-position monitor 406 may generate the gate-closed indication 1510 when the closed-position sensor 712 does sense the capture gate 402, and the open-position sensor 714 does not sense the capture gate 402.

A gate-closed 2nd indication 1512 indicates that the capture gate 402 of the charge-port capture detection mechanism 400 has is in a second closed position (not shown). This capture gate 402 is in this second closed position when the gate is closed (like as shown in FIG. 6) over HVDC charge-port caps 110 over each HVDC charge-port 302 rather than over engaged charge connector 108 of the charging cable 102. No cables connected to the HVDC charge-ports 302 and the protective HVDC charge-port caps 110 are covering them.

At 1520, one or more processors enable the charging of the externally rechargeable battery pack 1406 via the HVDC charge-port 302 of the BEV 104 in response to a determination that the gate-closed indication 1510 was received from the gate-position monitor 406. Thus, the gate-closed indication 1510 is an example of an engagement indication from the gate-position monitor 406.

At 1522, one or more processors disable or stop the charging of the externally rechargeable battery pack 1406 via the HVDC charge-port 302 of the BEV 104 in response to a determination that the gate-open indication 1508 or the gate-release indication 1506 was received from the gate-position monitor 406. Thus, either gate-open indication 1508 or the gate-release indication 1506 are examples of disengagement indications from the gate-position monitor 406.

At 1524, one or more processors enable or activate the traction system 1410 of the BEV 104 in response to a determination that the gate-closed 2nd indication 1512 was received from the gate-position monitor 406. Thus, the gate-closed 2nd indication 1512 is an example of an engagement indication from the gate-position monitor 406.

At 1526, one or more processors disable or deactivate the traction system 1410 of the BEV 104 in response to a determination that the gate-closed indication 1510, gate-open indication 1508, or gate-closed 2nd indication 1512 was received from the gate-position monitor 406. Thus, either the gate-closed indication 1510, the gate-open indication 1508, and the gate-closed 2nd indication 1512 are examples of disengagement indications from the gate-position monitor 406.

At 1528, one or more processors presents, via the operator interface 1412, a status report to the operator 304. This status report may indicate the present status of the traction system 1410, charging system 1404, and/or the position of the capture gate 402. For example, the status report may appear as a pop-up notification on a display screen of the BEV 104 to inform the operator that a charge of the rechargeable battery pack 1406 is prevented due to the capture gate 402 being open.

Note that the order in which the processes are described with respect to FIG. 15 is not intended to be construed as a limitation, and any number of the described process blocks can be combined in any order to implement the processes or an alternate process. Additionally, individual blocks may be deleted from the processes without departing from the spirit and scope of the subject matter described herein.

Figure 16:
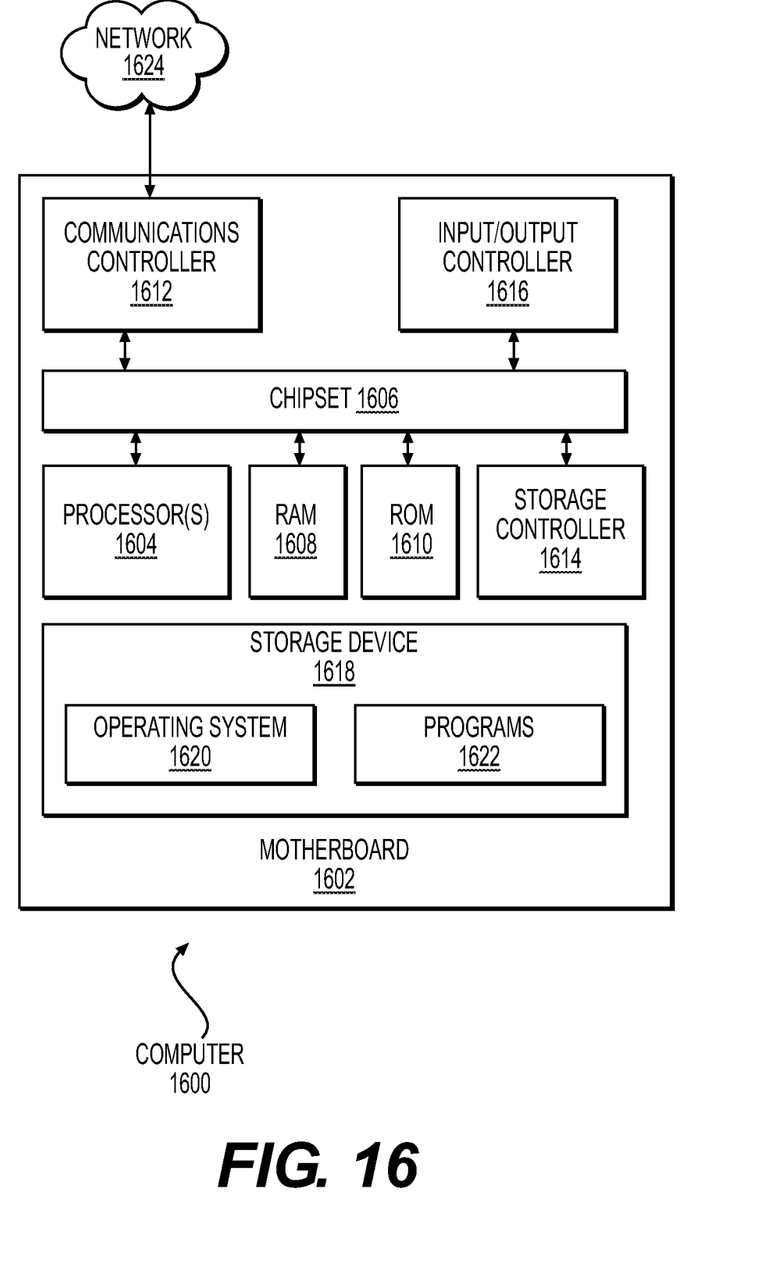
FIG. 16 illustrates a schematic diagram of a computer suitable to implement the example process of FIG. 15, in accordance with the technology described herein.

FIG. 16 shows an example computer architecture for a computer 1600 capable of executing program components for implementing the functionality described above. The computer architecture shown in FIG. 16 illustrates a conventional computer system, workstation, desktop computer, electronic control module, engine control module, laptop, tablet, network appliance, e-reader, smartphone, or another computing device, and can be utilized to execute any of the functionalities presented herein.

The computer 1600 includes a motherboard 1602, which is a printed circuit board to which a multitude of components or devices can be connected by way of a system bus or other electrical communication paths. In one illustrative configuration, one or more processors ("processor(s)") 1604 operate in conjunction with a chipset 1606. The processor(s) 1604 can be standard programmable processors that perform arithmetic and logical operations necessary for the operation of the computer 1600.

The processor(s) 1604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1606 provides an interface between the processor(s) 1604 and the remainder of the components and devices on the motherboard 1602. The chipset 1606 can provide an interface to a RAM 1608, used as the main memory in the computer 1600. The chipset 1606 can further provide an interface to a computer-readable storage medium such as read-only memory ("ROM") 1610 or non-volatile RAM ("NVRAM") for storing basic routines that help to startup the computer 1600 and to transfer information between the various components and devices. The ROM 1610 or NVRAM can also store other software components necessary for the operation of the computer 1600 in accordance with the configurations described herein.

The computer 1600 can operate in a networked environment using logical connections to remote computing devices and computer systems through a network, such as the network 1624. The chipset 1606 can include functionality for providing network connectivity through a communications controller 1612, such as a gigabit Ethernet adapter. The communications controller 1612 is capable of connecting the computer 1600 to other computing devices over the network 1624.

The computer 1600 can be connected to a storage device 1618 that provides non-volatile storage for the computer. The storage device 1618 can store an operating system 1620, programs 1622, and data. The programs 1622 may include processor-executable instructions that when executed by, for example, the processor(s) 1604, such instructions may cause the charging system 1404, the safety system 1408, the traction system 1410, and/or the operator interface 1412 to perform the recited operations of process 1500.

The storage device 1618 can be connected to the computer 1600 through a storage controller 1614 connected to the chipset 1606. The storage device 1618 can consist of one or more physical storage units. The storage controller 1614 can interface with the physical storage units through a serial attached SCSI ("SAS") interface, a serial advanced technology attachment ("SATA") interface, a fiber channel ("FC") interface, or other types of interface for physically connecting and transferring data between computers and physical storage units.

The computer 1600 can store data on the storage device 1618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 1618 is characterized as primary or secondary storage, and the like.

For example, the computer 1600 can store information to the storage device 1618 by issuing instructions through the storage controller 1614 to alter the magnetic characteristics of a particular location within a magnetic disk drive unit, the reflective or refractive characteristics of a particular location in an optical storage unit, or the electrical characteristics of a particular capacitor, transistor, or other discrete components in a solid-state storage unit. Other transformations of physical media are possible without departing from the scope and spirit of the present description, with the foregoing examples provided only to facilitate this description. The computer 1600 can further read information from the storage device 1618 by detecting the physical states or characteristics of one or more particular locations within the physical storage units.

In addition to the storage device 1618 described above, the computer 1600 can have access to other computer-readable storage media to store and retrieve information, such as program modules, data structures, or other data. It should be appreciated by those skilled in the art that computer-readable storage media is any available media that provides for the non-transitory storage of data, and that can be accessed by the computer 1600.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 1618 can store an operating system 1620 utilized to control the operation of the computer 1600. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 1618 can store other system or application programs and data utilized by the computer 1600.

In one embodiment, the storage device 1618 or other computer-readable storage media is encoded with processor-executable instructions which, when loaded into the computer 1600, transform the computer from a general-purpose computing system into a special-purpose computer capable of implementing the embodiments described herein. These processor-executable instructions transform the computer 1600 by specifying how the processor(s) 1604 transition between states, as described above. According to one embodiment, the computer 1600 has access to computer-readable storage media storing processor-executable instructions which, when executed by the computer 1600, perform the process described above with regard to FIG. 15. The computer 1600 can also include computer-readable storage media having instructions stored thereupon for performing any of the other computer-implemented operations described herein.

The computer 1600 can also include one or more input/output controllers 1616 for receiving and processing input from several input devices, such as a keyboard, a mouse, a touchpad, a touch screen, an electronic stylus, or other types of input devices. Similarly, an input/output controller 1616 can provide output to a display, such as a computer monitor, a flat-panel display, a digital projector, a printer, or other types of output devices. It will be appreciated that the computer 1600 might not include all of the components shown in FIG. 16, can include other components that are not explicitly shown in FIG. 16, or might utilize an architecture completely different than that shown in FIG. 16.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

INDUSTRIAL APPLICABILITY

With the techniques described herein, the operator 304 is hindered from unplugging the charge connector 108 of the charging cable 102 when that charge connector is engaged in the HVDC charge-port 302 of the BEV 104. The capture gate 402 of the charge-port capture detection mechanism 400 may be position into the closed position or the open position. In the closed position, the capture gate 402 is configured to capture the charge connector 108 engaged in the HVDC charge-port 302, thereby prohibiting removal of the charge connector 108 from the HVDC charge-port 302. In the open position, the capture gate 402 is configured to remain free from the charge connector 108 engaged in the HVDC charge-port 302, thereby permitting removal of the charge connector 108 from the HVDC charge-port 302. The gate-position monitor 406 detects the position of the capture gate 402 of the charge-port capture detection mechanism 400.

When the operator 304 moves the capture gate 402 of the charge-port capture detection mechanism 400 from the closed position, the gate-position monitor 406 sends an appropriate signal to indicate that charging of the rechargeable battery pack 1406 should cease. The charging stops before the operator 304 can physically unplug the charge connector 108 from the HVDC charge-port 302.

The HV power in the charge connector 108 will end before the operation 304 physically detaches the charge connector 108. Because of that, there is no danger of damage to the operator 304 or the equipment.

What is claimed is:

1. A charge-port capture detection mechanism comprising:
 a mounting base, the mounting base being connectable to a battery electric vehicle (BEV) at a location adjacent to a high-voltage, direct current (HVDC) charge-port; and
 a capture gate movably attached to the mounting base, the capture gate being moveable, relative to the mounting base, between a closed position in which the capture gate captures a charge connector of a charging cable engaged in the HVDC charge-port and an open position, wherein the charge-port capture detection mechanism is configured such that a minimum time duration required to transition the capture gate from the closed position to the open position is greater than a threshold time required for preventing arc flashing at the HVDC charge-port.

2. The charge-port capture detection mechanism of claim 1, wherein
 the arc flashing is associated with disengaging the charging cable from the HVDC charge-port, and
 the minimum time period is sufficient to:
  disengage the charging cable from the HVDC charge-port, and
  dissipate voltage directed to the HVDC charge-port via the charging cable.

3. The charge-port capture detection mechanism of claim 1, further comprising a gate-position monitor that detects a present position of the capture gate.

4. The charge-port capture detection mechanism of claim 3, wherein the gate-position monitor indicates engagement of the charge connector of the charging cable in response to the gate-position monitor detecting the present position of the capture gate being closed.

5. The charge-port capture detection mechanism of claim 3, wherein the gate-position monitor includes a sensor positioned adjacent to the HVDC charge-port and at an end of a path of travel of the capture gate towards the HVDC charge-port, wherein the sensor is configured to detect presence of the capture gate and, in response, indicate that the present position of the capture gate being closed.

6. The charge-port capture detection mechanism of claim 3, wherein the gate-position monitor indicates disengagement of the charge connector of the charging cable in response to the gate-position monitor detecting the present position of the capture gate being open.

7. The charge-port capture detection mechanism of claim 3, wherein the gate-position monitor includes a sensor positioned at an end of a path of travel of the capture gate from the HVDC charge-port, wherein the sensor is configured to detect presence of the capture gate and, in response, indicate that the present position of the capture gate being open.

8. The charge-port capture detection mechanism of claim 1 further comprising a movable attachment that movably attaches the capture gate to the mounting base, wherein the movable attachment includes one or more hinges that enable the capture gate to swing away from HVDC charge-port in the open position and towards the HVDC charge-port in the closed position.

9. A battery electric vehicle (BEV) comprising:
an externally rechargeable battery pack;
a high-voltage, direct current (HVDC) charge-port with a receptacle to engage a charge connector of a charging cable from an external HVDC power source; and
a charge-port capture detection mechanism including:
a mounting base, the mounting base being connectable to a BEV at a location adjacent to the HVDC charge-port; and
a capture gate movably attached to the mounting base, the capture gate being moveable, relative to the mounting base, between a closed position, in which the capture gate is configured to capture the charge connector engaged in the HVDC charge-port, thereby prohibiting removal of the charge connector from the HVDC charge-port, and an open position, in which the capture gate is configured to remain free from the charge connector engaged in the HVDC charge-port, thereby permitting removal of the charge connector from the HVDC charge-port, wherein the charge-port capture detection mechanism is configured such that a minimum time duration required to transition the capture gate from the closed position to the open position is greater than a threshold time required for preventing arc flashing associated with removing the charge connector from the HVDC charge-port.

10. The BEV of claim 9 further comprising a movable attachment that movably attaches the capture gate to the mounting base, wherein:
the movable attachment biases the capture gate in the closed position against the charge connector engaged in the HVDC charge-port, and
the minimum time period is required to dissipate voltage directed to the HVDC charge-port via the charge connector.

11. The BEV of claim 9, wherein the charge-port capture detection mechanism further includes a gate-position monitor that detects a present position of the capture gate.

12. The BEV of claim 11, wherein the gate-position monitor indicates engagement of the charge connector in response to the gate-position monitor detecting the present position of the capture gate being closed.

13. The BEV of claim 12 further comprising a safety system enables charging of the externally rechargeable battery pack in response to the engagement indication by the gate-position monitor.

14. The BEV of claim 11, wherein the gate-position monitor indicates disengagement of the charge connector in response to the gate-position monitor no longer detecting the present position of the capture gate being closed.

15. The BEV of claim 14 further comprising a safety system disables charging of the externally rechargeable battery pack in response to a disengagement indication by the gate-position monitor.

16. A method comprising:
obtaining a gate-release indication that a capture gate has transitioned from a closed position to an open position, wherein in a closed position, in which the capture gate is configured to capture a charge connector engaged in an HVDC charge-port of a battery electric vehicle (BEV), thereby prohibiting removal of the charge connector from the HVDC charge-port, and an open position, in which the capture gate is configured to remain free from the charge connector engaged in the HVDC charge-port, thereby permitting removal of the charge connector from the HVDC charge-port; and
in response to the gate-release indication, disabling charging of an externally rechargeable battery pack via the HVDC charge-port of the BEV, wherein the capture gate is configured such that a minimum time duration required to transition the capture gate from the closed position to the open position is greater than a threshold time required for preventing arc flashing associated with removing the charge connector from the HVDC charge-port.

17. The method of claim 16 further comprising:
obtaining a gate-open indication that the capture gate is in the open position; and
in response to the gate-open indication, disabling a traction system of the BEV.

18. The method of claim 16 further comprising:
obtaining a gate-closed indication that the capture gate is in the closed position; and
in response to the gate-closed indication, enabling charging of the externally rechargeable battery pack via the HVDC charge-port of the BEV.

19. The method of claim 16 further comprising:
obtaining a gate-closed indication that the capture gate is in the closed position; and
in response to the gate-closed indication, disabling a traction system of the BEV.

20. The method of claim 16 further comprising:
obtaining an indication that the capture gate is in a second closed position; and
in response to the indication that the capture gate is in a second closed position, enabling a traction system of the BEV and disabling charging of the externally rechargeable battery pack via the HVDC charge-port of the BEV.

* * * * *